US012627104B2

(12) United States Patent
Mahoney

(10) Patent No.: US 12,627,104 B2
(45) Date of Patent: May 12, 2026

(54) COAXIAL CABLE SEIZURE ASSEMBLY WITH STAMPED CONDUCTOR FOR USE IN A HYBRID FIBER-COAXIAL (HFC) NETWORK DEVICE

(71) Applicant: Applied Optoelectronics, Inc., Sugar Land, TX (US)

(72) Inventor: William G. Mahoney, Suwanee, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 289 days.

(21) Appl. No.: 18/223,801

(22) Filed: Jul. 19, 2023

(65) Prior Publication Data

US 2025/0030209 A1 Jan. 23, 2025

(51) Int. Cl.
*H01R 24/54* (2011.01)
*H01R 24/50* (2011.01)
*H01R 103/00* (2006.01)

(52) U.S. Cl.
CPC ........... *H01R 24/545* (2013.01); *H01R 24/50* (2013.01); *H01R 24/542* (2013.01); *H01R 2103/00* (2013.01)

(58) Field of Classification Search
CPC .... H01R 24/545; H01R 24/50; H01R 24/542; H01R 2103/00
USPC .......................................... 439/582, 578, 63
See application file for complete search history.

(56) References Cited

U.S. PATENT DOCUMENTS

| | | | |
|---|---|---|---|
| 1,928,916 | A | 10/1933 | Tucker |
| 2,531,625 | A | 11/1950 | Hubbell |
| 6,094,352 | A | 7/2000 | Reddy et al. |
| 6,593,830 | B2 | 7/2003 | Wu |
| 6,811,447 | B2 | 11/2004 | Pfister et al. |
| 7,625,247 | B1 | 12/2009 | Mahoney et al. |
| 8,047,872 | B2 | 11/2011 | Burris et al. |

(Continued)

FOREIGN PATENT DOCUMENTS

| | | |
|---|---|---|
| CN | 203690511 U | 7/2014 |

OTHER PUBLICATIONS

Chinese Office Action issued Jan. 22, 2026, received in Chinese Application No. CN202211082351.2, with English language translation included.

*Primary Examiner* — Tulsidas C Patel
*Assistant Examiner* — Thaslimur Rahman
(74) *Attorney, Agent, or Firm* — Grossman Tucker Perreault & Pfleger, PLLC; Norman S. Kinsella

(57) ABSTRACT

A coaxial cable seizure assembly includes a stamped conductor with a leaf spring receptacle portion to provide a coaxial cable connection inside an HFC network device, such as an HFC node or amplifier. The stamped conductor portion is stamped from a single piece of metal and is located in an insulator portion. The insulator portion may be located inside a housing of the HFC network device adjacent a coaxial cable port such that the leaf spring receptacle portion is aligned with and receives a coaxial cable center conductor pin of a coaxial cable connected to the port. In one embodiment, a coaxial cable seizure assembly further includes a pin portion formed from the same piece of metal as the leaf spring receptacle. In another embodiment, a PCB-mounted coaxial cable seizure assembly further includes a PCB mounting portion formed from the same piece of metal as the leaf spring receptacle.

20 Claims, 14 Drawing Sheets

(56) References Cited

U.S. PATENT DOCUMENTS

| | | | | |
|---|---|---|---|---|
| 10,218,123 | B1 | 2/2019 | Mahoney | |
| 10,424,424 | B2 | 9/2019 | Farrell et al. | |
| 11,456,566 | B2 | 9/2022 | Mahoney et al. | |
| 2006/0281370 | A1 | 12/2006 | Mahoney et al. | |
| 2013/0157503 | A1* | 6/2013 | Sykes .................... | H01R 24/44<br>439/578 |
| 2019/0157778 | A1* | 5/2019 | Barthelmes .......... | H01R 9/0527 |
| 2021/0143564 | A1* | 5/2021 | Smith .................. | H01R 13/405 |
| 2021/0218182 | A1 | 7/2021 | Jacobson et al. | |
| 2021/0281026 | A1* | 9/2021 | Mahoney ............... | H01R 24/44 |

* cited by examiner

COAXIAL CABLE SEIZURE ASSEMBLY WITH STAMPED CONDUCTOR FOR USE IN A HYBRID FIBER-COAXIAL (HFC) NETWORK DEVICE

TECHNICAL FIELD

The present disclosure relates to coaxial cable connector seizure assemblies, and more particularly, to a coaxial cable seizure assembly with a stamped conductor for use in a hybrid fiber-coaxial (HFC) network device.

BACKGROUND INFORMATION

Hybrid fiber-coaxial (HFC) networks are used to provide high bandwidth communication between a headend/hub and end users such as homes and businesses. Such HFC networks are often used, for example, to provide cable television (CATV) and internet services to the end users. An HFC network architecture generally includes optical fiber for carrying optical signals (e.g., from the headend/hub), coaxial cables for carrying RF signals (e.g., to the end users), and HFC network devices, such as HFC nodes, amplifiers, and taps, that connect to the optical fiber and/or coaxial cables. The Data Over Cable Service Interface Specification (DOCSIS) has been adopted to standardize continued improvements of existing HFC networks in order to provide additional bandwidth for enhanced TV and Internet services, and there may be a need to upgrade the HFC network infrastructure to meet increasing bandwidth demands, for example, when moving from DOCSIS 3.1 to DOCSIS 4.0.

Connections between HFC network devices and coaxial cables should allow a cable to be relatively easily connected while providing the desired RF performance at the RF frequencies of the HFC network. An HFC network device, such as an HFC node or amplifier, may include a coaxial cable port where the coaxial cable is connected with a cable center conductor pin (also referred to as the “stinger”) electrically connected inside the HFC network device using a coaxial cable seizure assembly. The length and contact of that cable center conductor pin may affect the RF connection and performance. As such, the connections between the HFC network devices and the coaxial cables may need to be upgraded as the network moves to a different DOCSIS standard with higher bandwidths and RF frequencies.

SUMMARY

Consistent with one aspect of the present disclosure, a seizure assembly may be used to connect to a coaxial cable in a hybrid fiber-coaxial (HFC) network device. The seizure assembly includes an insulator portion defining a spring receptacle passageway extending to a center conductor pin receiving opening in a side of the insulator portion and a stamped conductor fixed in the insulator portion. The stamped conductor includes a leaf spring receptacle portion located in the spring receptacle passageway adjacent the center conductor pin receiving opening. The leaf spring receptacle portion is configured to receive a coaxial cable center conductor pin that passes through the center conductor pin receiving opening. The stamped conductor is stamped from a single piece of metal.

Consistent with another aspect of the present disclosure, a PCB-mounted coaxial cable seizure assembly may be used to connect to a coaxial cable in a hybrid fiber coaxial (HFC) network device. The PCB-mounted coaxial cable seizure assembly includes a printed circuit board (PCB), an insulator portion mounted to the PCB, and a stamped conductor fixed in the insulator portion. The insulator portion defines a spring receptacle passageway extending to a center conductor pin receiving opening in a side of the insulator portion. The stamped conductor includes a leaf spring receptacle portion and a PCB mounting portion formed from a single piece of metal. The leaf spring receptacle portion is located in the spring receptacle passageway adjacent to the center conductor pin receiving opening. The leaf spring receptacle portion is configured to receive a coaxial cable center conductor pin that passes through the center conductor pin receiving opening. The PCB mounting portion extends from the leaf spring portion and is electrically connected to the PCB.

Consistent with a further aspect of the present disclosure, a hybrid-fiber coaxial (HFC) network device includes a housing including at least one coaxial cable port configured to connect to a coaxial cable external to the housing and at least one seizure assembly secured in the housing adjacent to the coaxial cable port such that a coaxial cable center conductor pin of the coaxial cable extends through the coaxial cable port and into the seizure assembly. The seizure assembly includes an insulator portion defining a spring receptacle passageway extending to a center conductor pin receiving opening in a side of the insulator portion. The spring receptacle passageway aligns with the at least one coaxial cable port in the housing. The seizure assembly also includes a stamped conductor fixed in the insulator portion. The stamped conductor includes a leaf spring receptacle portion located in the spring receptacle passageway adjacent the center conductor pin receiving opening. The leaf spring receptacle portion is configured to receive and engage with the coaxial cable center conductor pin extending into the at least one coaxial cable port and passing through the center conductor pin receiving opening. The stamped conductor is stamped from a single piece of metal.

BRIEF DESCRIPTION OF THE DRAWINGS

These and other features and advantages will be better understood by reading the following detailed description, taken together with the drawings wherein.

DETAILED DESCRIPTION

Figure 1:
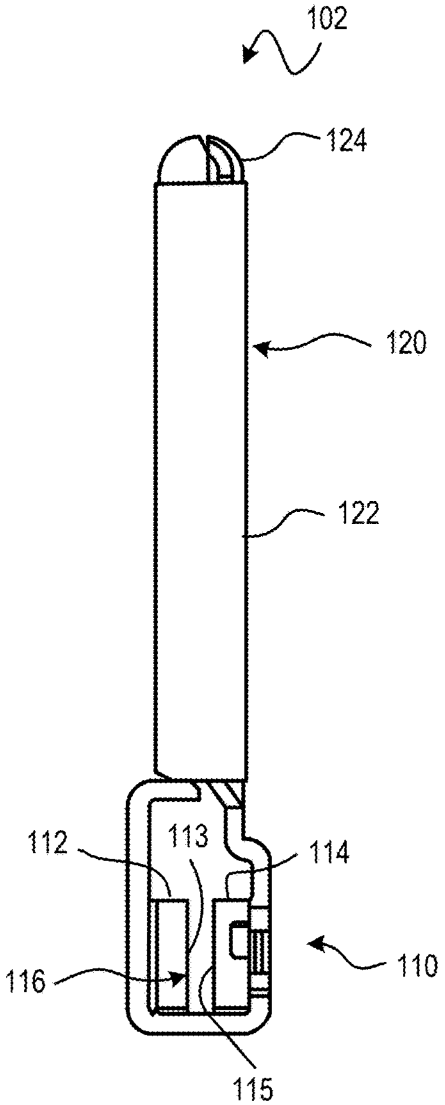
FIG. 1 is a side view of a stamped conductor for use in a coaxial cable seizure assembly, consistent with an embodiment of the present disclosure.

A coaxial cable seizure assembly, consistent with embodiments of the present disclosure, includes a stamped conductor with a leaf spring receptacle portion to provide a coaxial cable connection inside an HFC network device, such as an HFC node or amplifier. The stamped conductor portion is stamped from a single piece of metal and is located in an insulator portion. The insulator portion may be located inside a housing of the HFC network device adjacent a coaxial cable port such that the leaf spring receptacle portion is aligned with and receives a coaxial cable center conductor pin of a coaxial cable connected to the coaxial cable port. In one embodiment, a coaxial cable seizure assembly includes a stamped conductor with the leaf spring portion and a pin portion configured to mate with a coaxial RF connector (e.g., a G-type connector) inside the housing. In another embodiment, a PCB-mounted coaxial cable seizure assembly includes a stamped conductor with the leaf spring portion and a PCB mounting portion formed from the same piece of metal as the leaf spring receptacle. The PCB mounting portion is mounted and electrically connected to a printed circuit board (PCB) such that the PCB electrically connects the stamped conductor to a pin that is mounted to the PCB and configured to mate with a coaxial RF connector (e.g., a G-type connector) inside the housing.

Older network devices have used a set screw and star washer to secure the coaxial cable center conductor pin, but such connectors required the housing to be opened for installation, and variations in the length of the center conductor pin and torque resulted in performance issues. Newer HFC network devices have used spring-loaded seizure assemblies, which facilitate connection of the coaxial cable center conductor pin but have not adequately resolved other problems such as the center conductor pin length and impedance control. As such, the spring-loaded seizure mechanisms may become a weak RF entry point, especially at higher frequencies (e.g., up to 3 GHZ) required by CATV DOCSIS 4.0 standards.

Other coaxial cable seizure assemblies have used a one-piece conductor, for example, as disclosed in U.S. Pat. No. 11,456,566, which is commonly owned and incorporated herein by reference. Such a one-piece conductor is an improvement over prior set screw and spring-loaded seizure assemblies but may not adequately connect with different sized coaxial cable center conductor pins and may not provide the desired RF performance. In particular, the coaxial cable seizure assembly disclosed in U.S. Pat. No. 11,456,566 may have a more limited range for the diameter and/or length of the coaxial cable center conductor pin.

The coaxial cable seizure assembly including a stamped conductor with a leaf spring receptacle portion, consistent with embodiments of the present disclosure, allows a relatively simple and consistent connection with the coaxial cable center conductor pin and is capable of providing the desired RF performance. The stamped conductor is also easier to fabricate, as compared to the set-screw and spring-loaded seizure assemblies and other one-piece conductors.

Figure 2:
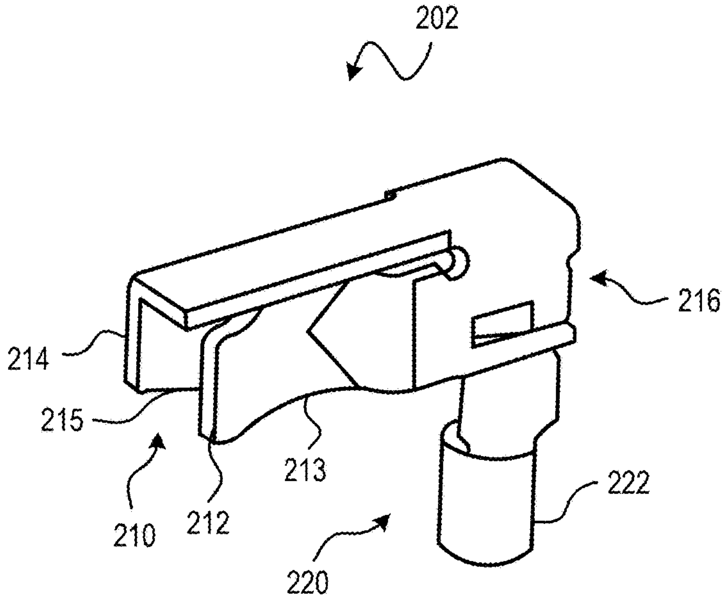
FIG. 2 is a side perspective view of a stamped conductor for use in a coaxial cable seizure assembly, consistent with another embodiment of the present disclosure.
Figure 3A:
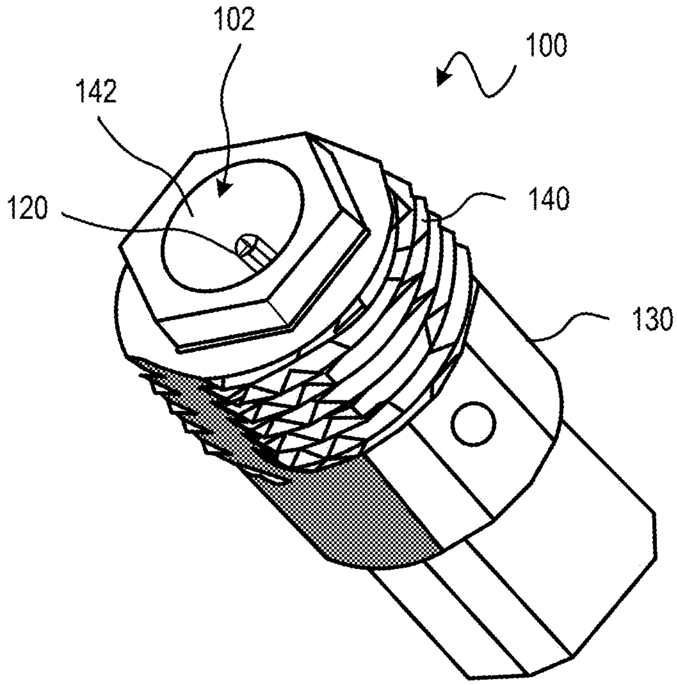
FIG. 3A is a perspective view of an embodiment of a coaxial cable seizure assembly including the stamped conductor shown in FIG. 1.
Figure 3B:
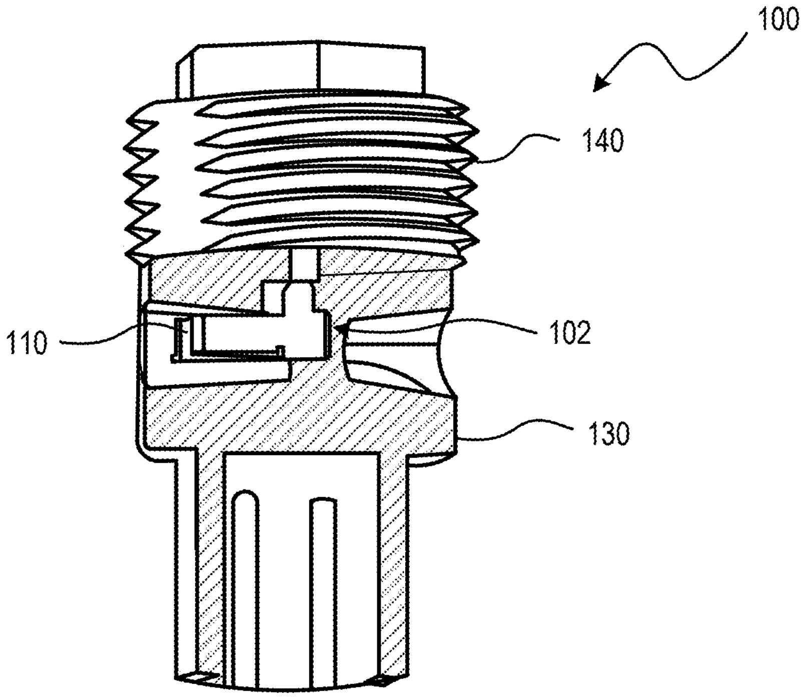
FIG. 3B is a partially cross-sectional view of an embodiment of a coaxial cable seizure assembly including the stamped conductor shown in FIG. 1.

Referring to FIGS. 1 and 2, two different embodiments of the stamped conductor 102, 202 used with embodiments of coaxial cable seizure assemblies, consistent with the present disclosure, are shown and described in detail. Both of the stamped conductors 102, 202 include a leaf spring receptacle 110, 210 having a similar design and are stamped from a single piece of metal. The stamped conductors 102, 202 may be stamped, for example, from a 0.30 mm high conductive copper, using progressive die tooling. This material provides high strength, good conductivity (both heat and electrical), and good spring force.

The leaf spring receptacles 110, 120 include opposing leaf spring members 112, 114, 212, 214 with rounded portions 113, 115, 213, 215 that define center pin receiving passageways. The rounded portions 113, 115, 213, 215 are spaced with a spacing that is less than a diameter of a coaxial cable center conductor pin (not shown in FIGS. 1 and 2) such that the coaxial cable center conductor pin engages the rounded portions 113, 115, 213, 215 of the opposing leaf spring members 112, 114, 212, 214 with a friction fit when inserted in the center pin receiving passageway. The opposing leaf spring members 112, 114, 212, 214 are biased against the center conductor pin to secure the center conductor pin and to provide an electrical connection between the rounded portions 113, 115, 213, 215 of the opposing leaf spring members 112, 114, 212, 214 and the center conductor pin. The contact provided by the opposing leaf spring members 112, 114, 212, 214 may have a box shape to increase the cross section allowing for higher current carrying capability. The center pin receiving passageway may also be open at a back end 116, 216 of the leaf spring receptacle 110, 210 to allow a longer center conductor pin to be received in the leaf spring receptacles 110, 120.

The stamped conductor 102 shown in FIG. 1 also includes a pin portion 120 formed from the same piece of metal as the leaf spring receptacle portion 110. The pin portion 120 is configured to engage a coaxial RF connector, such as a G-type connector, located in an HFC network device, as will be described in greater detail below. In the illustrated embodiment, the pin portion 120 includes an elongated, cylindrical body 122 and a rounded tip 124, although other shapes and configurations are contemplated and within the scope of the present disclosure.

The stamped conductor 202 shown in FIG. 2 also includes a PCB mounting portion 220 formed from the same piece of metal as the leaf spring receptacle portion 210. The PCB mounting portion 220 is configured to be mounted and electrically connected to a PCB, as will be described in greater detail below. In the illustrated embodiment, the PCB mounting portion 220 includes a cylindrical body 122 configured to be received, for example, in a via of a PCB, although other shapes and configurations are contemplated and within the scope of the present disclosure.

Referring to FIGS. 3A and 3B and 4A-4E, a coaxial cable seizure assembly 100 including the stamped conductor 102 shown in FIG. 1 is described in greater detail. In the coaxial cable seizure assembly 100, the stamped conductor 102 is located in an insulator portion 130 such that the leaf spring receptacle portion 110 and the pin portion 120 are able to connect with the respective coaxial cable center conductor pin and the coaxial RF connector, respectively, in a housing of an HFC network device. In one example, the stamped conductor 102 may be sandwiched between two pieces of plastic forming the insulator portion 130 and is fixed in the insulator portion 130 such that there is no movement of the stamped conductor 102 relative to the insulator portion 130 other than the leaf spring members moving to receive the center conductor pin. The insulator portion 130 may be made of a dielectric material, such as a plastic material.

The insulator portion 130 is configured to be received in a receptacle in the housing of the HFC network device and secured by a lock nut 140, as will be described in greater detail below. The lock nut 140 includes an aperture 142 that defines a receptacle for receiving the coaxial RF connector.

Figure 4A:
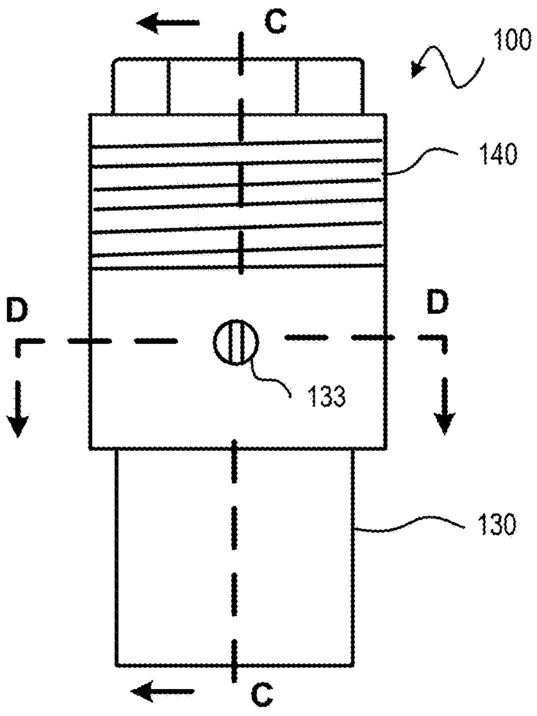
FIG. 4A is a side view of the coaxial cable seizure assembly shown in FIG. 3A.
Figure 4B:
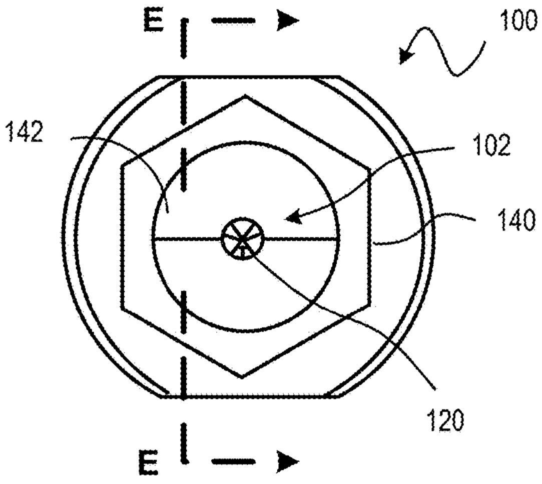
FIG. 4B is a top view of the coaxial cable seizure assembly shown in FIG. 3A.
Figure 4C:
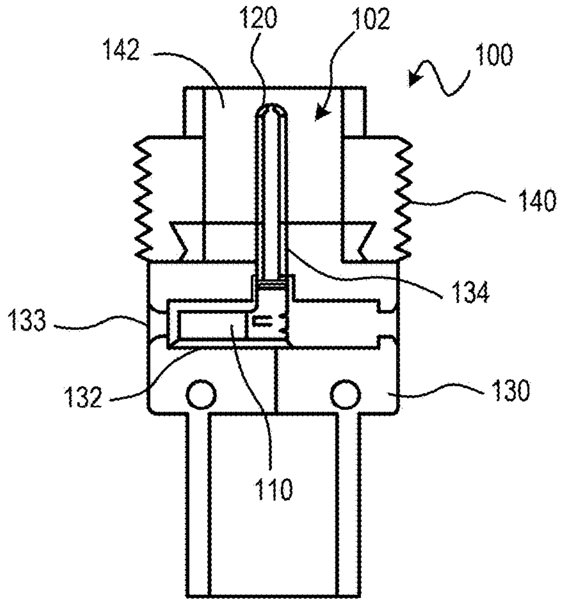
FIG. 4C is a cross-sectional view of the coaxial cable seizure assembly taken along line C-C in FIG. 4A.
Figure 4D:
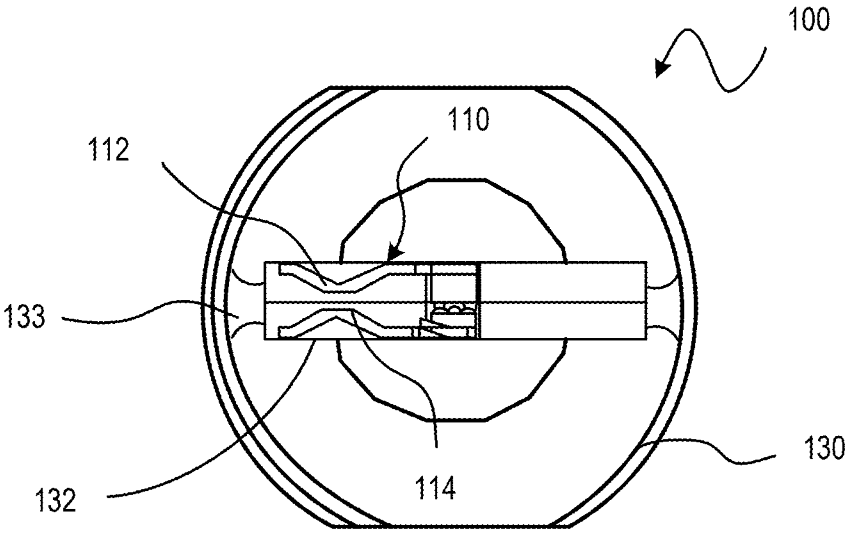
FIG. 4D is a cross-sectional view of the coaxial cable seizure assembly taken along line D-D in FIG. 4A.
Figure 4E:
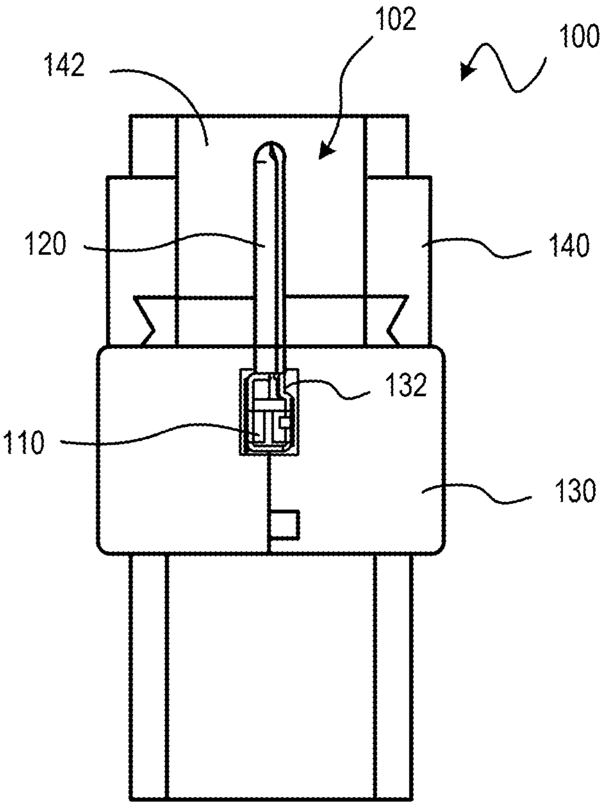
FIG. 4E is a cross-sectional view of the coaxial cable seizure assembly taken along line E-E in FIG. 4B.
Figure 5A:
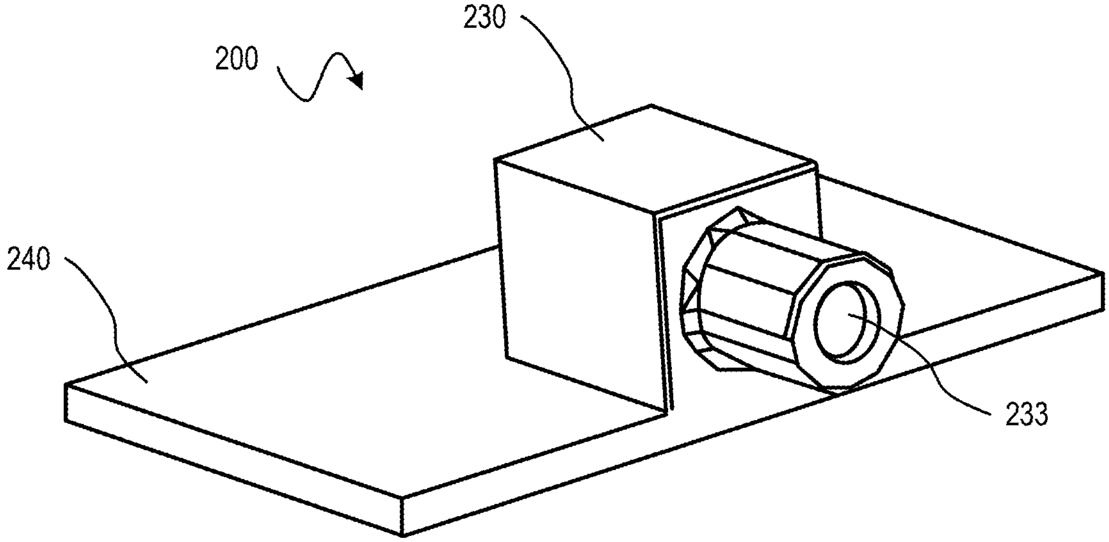
FIG. 5A is a front perspective view of a PCB-mounted coaxial cable seizure assembly including the stamped conductor shown in FIG. 2.
Figure 5B:
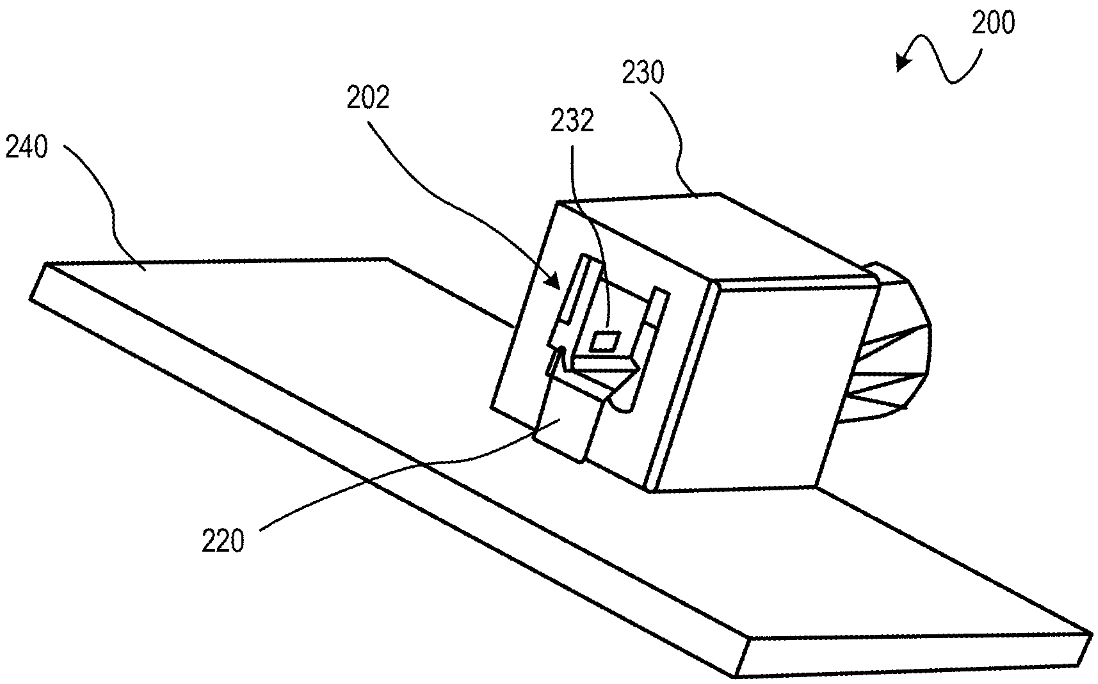
FIG. 5B is a rear perspective view of a PCB-mounted coaxial cable seizure assembly including the stamped conductor shown in FIG. 2.

As shown in FIGS. 4A-4E, the insulator portion 130 includes a spring receptacle passageway 132 extending to a center conductor pin receiving opening 133 in a side of the insulator portion 130. The leaf spring receptacle portion 110 is located in the spring receptacle passageway 132 such that a coaxial cable center conductor pin (not shown) passing through the center conductor pin receiving opening 133 will be engaged between the opposing leaf spring members 112, 114 of the leaf spring receptacle 110 (see FIG. 4D). The leaf spring receptacle passageway 132 may extend beyond the leaf spring receptacle portion 110 and possibly to an opposite side of the insulator portion 130 (e.g., as shown in FIGS. 4C and 4D) to accommodate a longer coaxial cable center conductor pin that might extend through the leaf spring receptacle portion 110.

In this embodiment of the coaxial cable seizure assembly 100, the insulator portion 130 also includes a pin passageway 134 extending from the spring receptacle passageway 132 to a first end of the insulator portion 130. The pin portion 120 is located in the pin passageway 134 and extends beyond the first end of the insulator portion 130 and into the aperture 142 defined by the lock nut 140. The aperture 142 defined by the lock nut 140 surrounds the pin portion 120 and provides a receptacle configured to receive a coaxial RF connector in the HFC network device, such as a G-type connector, as will be described in greater detail below.

Referring to FIGS. 5A and 5B and 6A-6C, a PCB-mounted coaxial cable seizure assembly 200 including the stamped conductor 202 shown in FIG. 2 is described in greater detail. In the PCB-mounted coaxial cable seizure assembly 200, the stamped conductor 202 is located in an insulator portion 230 that is mounted to a PCB 240, for example, with a mounting member 236 (see FIG. 6B). The PCB mounting portion 220 of the stamped conductor 202 is mounted and electrically connected to the PCB 240, which may provide a connection to a connector in an HFC network device, as will be described in greater detail below.

Figure 6A:
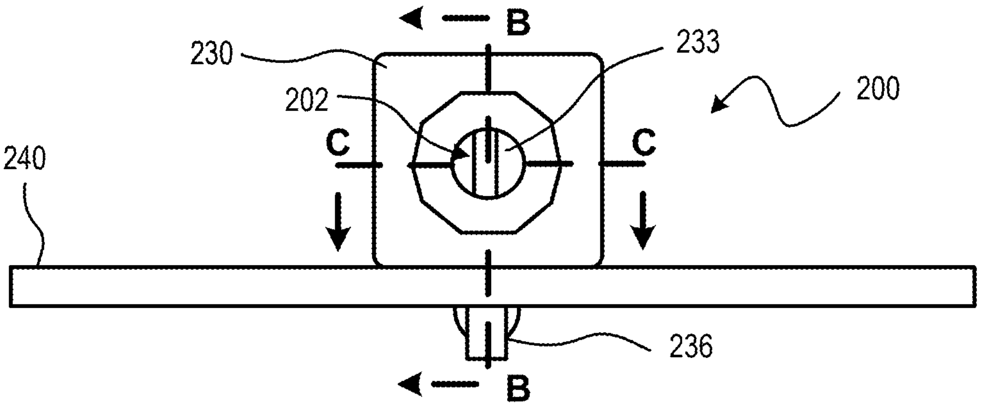
FIG. 6A is a front view of the PCB-mounted coaxial cable seizure assembly shown in FIGS. 5A and 5B.
Figure 6B:
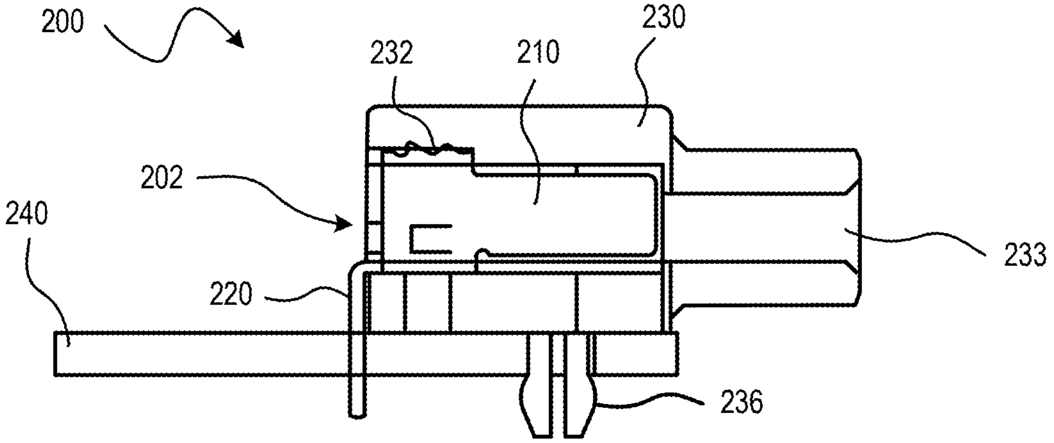
FIG. 6B is a cross-sectional view of the PCB-mounted coaxial cable seizure assembly taken along line B-B in FIG. 6A.
Figure 6C:
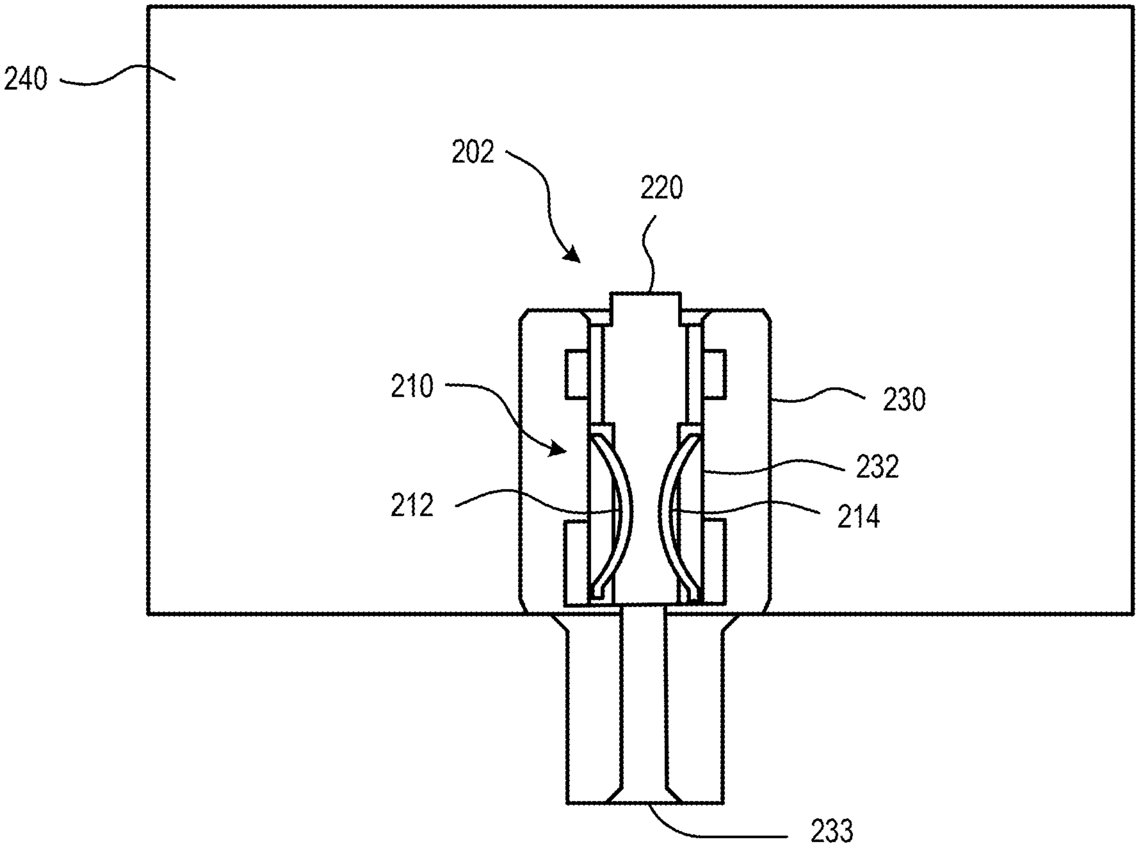
FIG. 6C is a cross-sectional view of the PCB-mounted coaxial cable seizure assembly taken along line C-C in FIG. 6A.

As shown in FIGS. 6A-6C, the insulator portion 230 includes a spring receptacle passageway 232 extending to a center conductor pin receiving opening 233 in a side of the insulator portion 230. The leaf spring receptacle portion 210 is located in the spring receptacle passageway 232 such that a coaxial cable center conductor pin (not shown) passing through the center conductor pin receiving opening 233 will be engaged between the opposing leaf spring members 212, 214 of the leaf spring receptacle 210 (see FIG. 6C). The leaf spring receptacle passageway 232 may also be open at a back side (e.g., as shown in FIG. 6B) to accommodate a longer coaxial cable center conductor pin that might extend through the leaf spring receptacle portion 210.

In this embodiment of the coaxial cable seizure assembly 200, the PCB-mounting portion 220 extends from the insulator portion 230 to the PCB 240 and is electrically connected to a conductive path on the PCB 240. The stamped conductor 202 of the coaxial cable seizure assembly 200 may thus be electrically connected via the PCB 240 to a pin (not shown in FIGS. 6A-6C) mounted to the PCB 240 and configured to mate with a coaxial RF connector, such as a G-type connector, in a housing of an HFC network device.

Figure 7A:
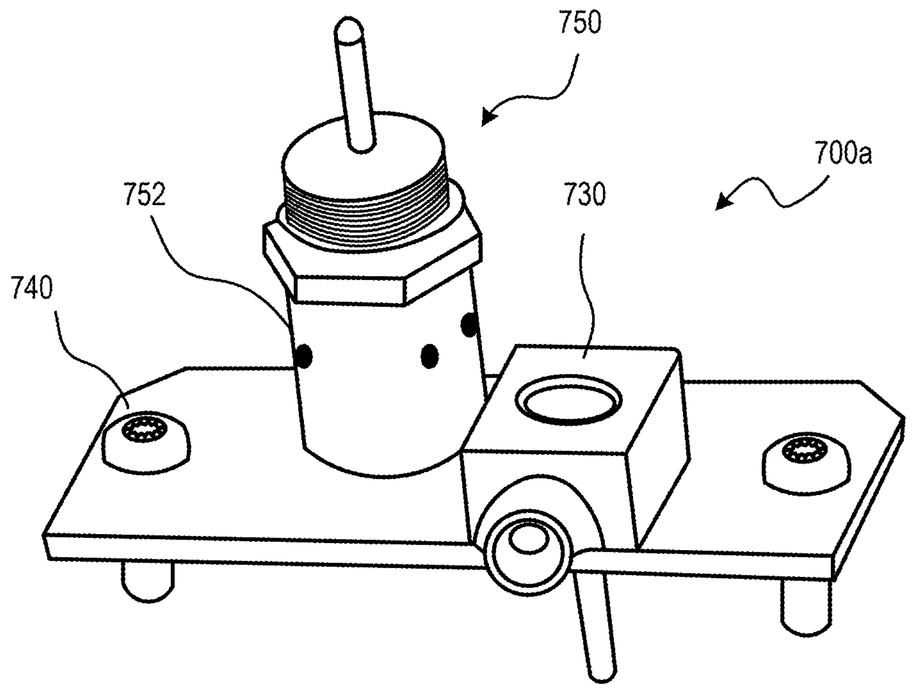
FIGS. 7A-7D are perspective views of PCB-mounted coaxial cable seizure assemblies, consistent with different embodiments of the present disclosure.
Figure 7B:
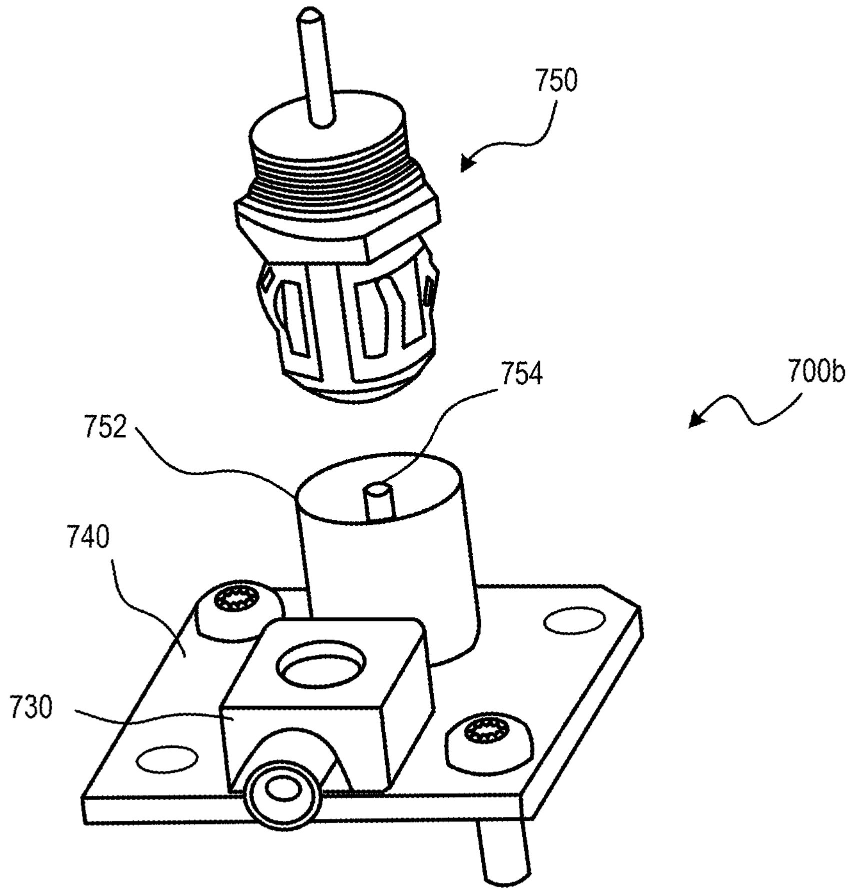
Figure 7C:
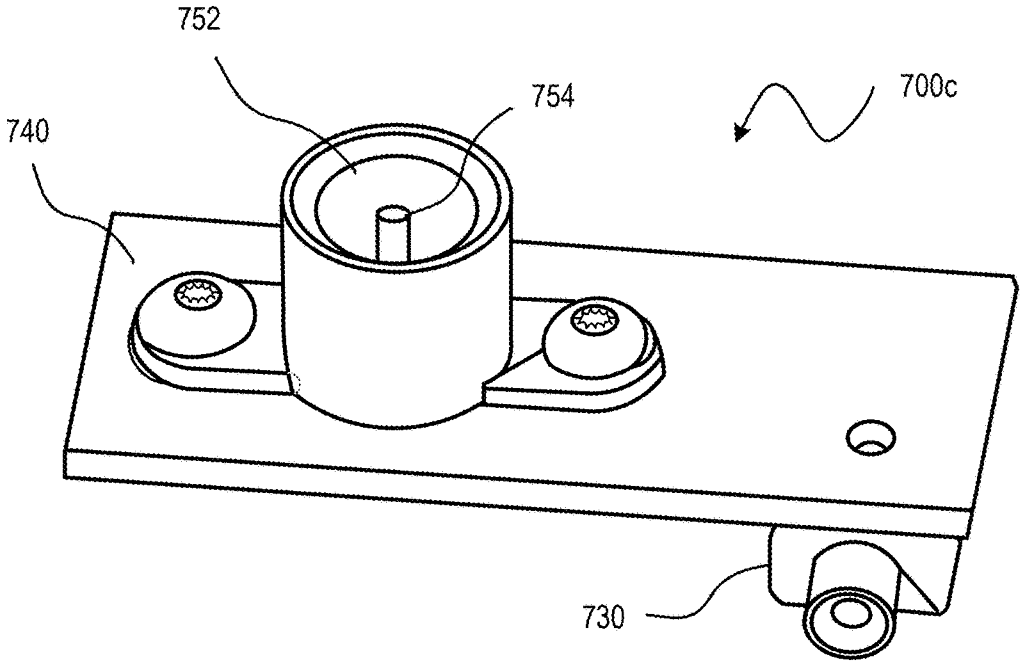
Figure 7D:
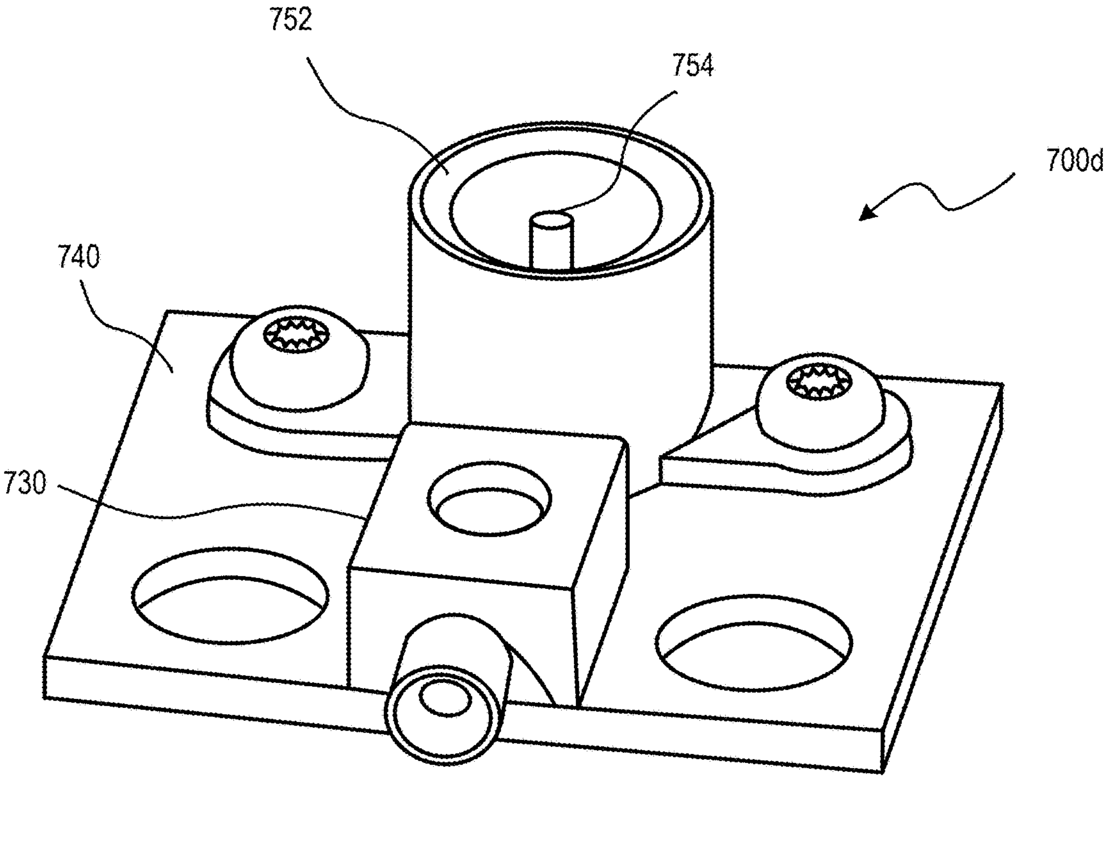

FIGS. 7A-7D illustrate different embodiments of PCB-mounted coaxial cable seizure assemblies 700*a*-700*d* configured to be connected to a G-type connector 750. The insulator portion 730 with a stamped conductor (not shown in FIGS. 7A-7D) is mounted on the PCB 740 and a coaxial RF connector receptacle 752 with a pin 754 is also mounted to the PCB 740 with the pin 754 electrically connected, via a conductive path on the PCB 740, to the stamped conductor inside the insulator portion 730. The coaxial RF connector receptacle 752 and pin 754 may be mounted on the same side of the PCB 740 as the insulator portion 730 including the stamped conductor, as shown in FIGS. 7A, 7B, and 7D, or mounted on opposite sides of the PCB 740, as shown in FIG. 7C.

In the embodiments of the coaxial seizure assembly 100 and the PCB-mounted coaxial seizure assemblies 700*a*-700*d*, the pin (e.g., the pin portion 120 in the coaxial seizure assembly 100 or the pin 754 mounted to the PCB 740 in the coaxial seizure assemblies 700*a*-700*d*) may be configured to connect with a coaxial RF connector inside a HFC network device, such as a G-type connector or an F-type connector. The coaxial RF connector may include an inner conductive portion and an aperture that receives the pin such that the pin electrically connects to the inner conductive portion. The coaxial RF connector may also include an outer mating section that is received in the lock nut 140 of the coaxial cable seizure assembly 100 or the connector receptacle 754 of a PCB-mounted coaxial cable seizure assembly 700*a*-700*d*. In one example, the coaxial RF connector may have a larger outer diameter (e.g., at least 10 mm), for example, as described in greater detail in U.S. Patent Application Pub. No. 2023/0006402, which is commonly owned and incorporated herein by reference.

Figure 8A:
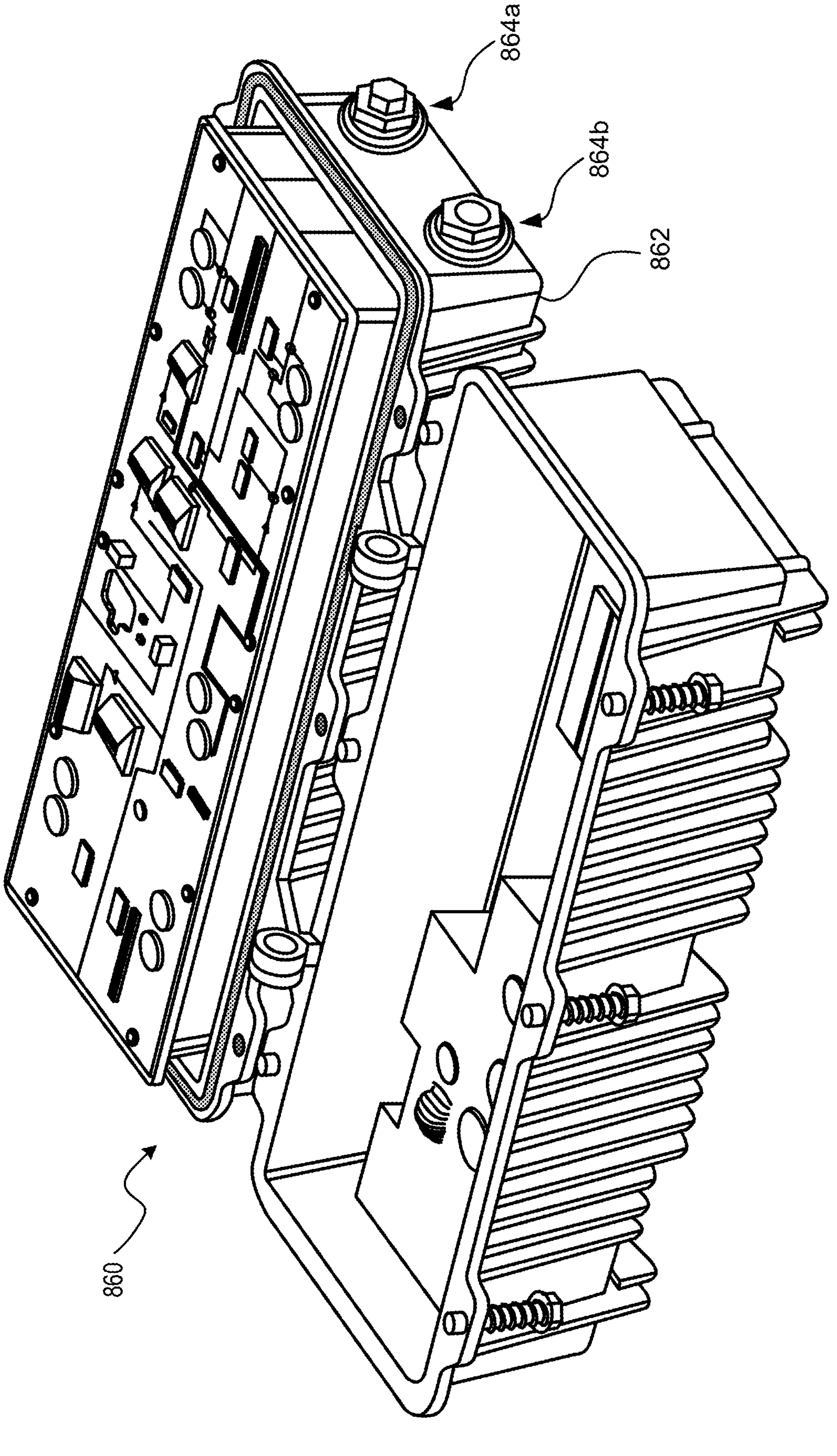
FIG. 8A is a hybrid fiber-coaxial (HFC) network amplifier including a coaxial cable seizure assembly, consistent with an embodiment of the present disclosure.
Figure 8B:
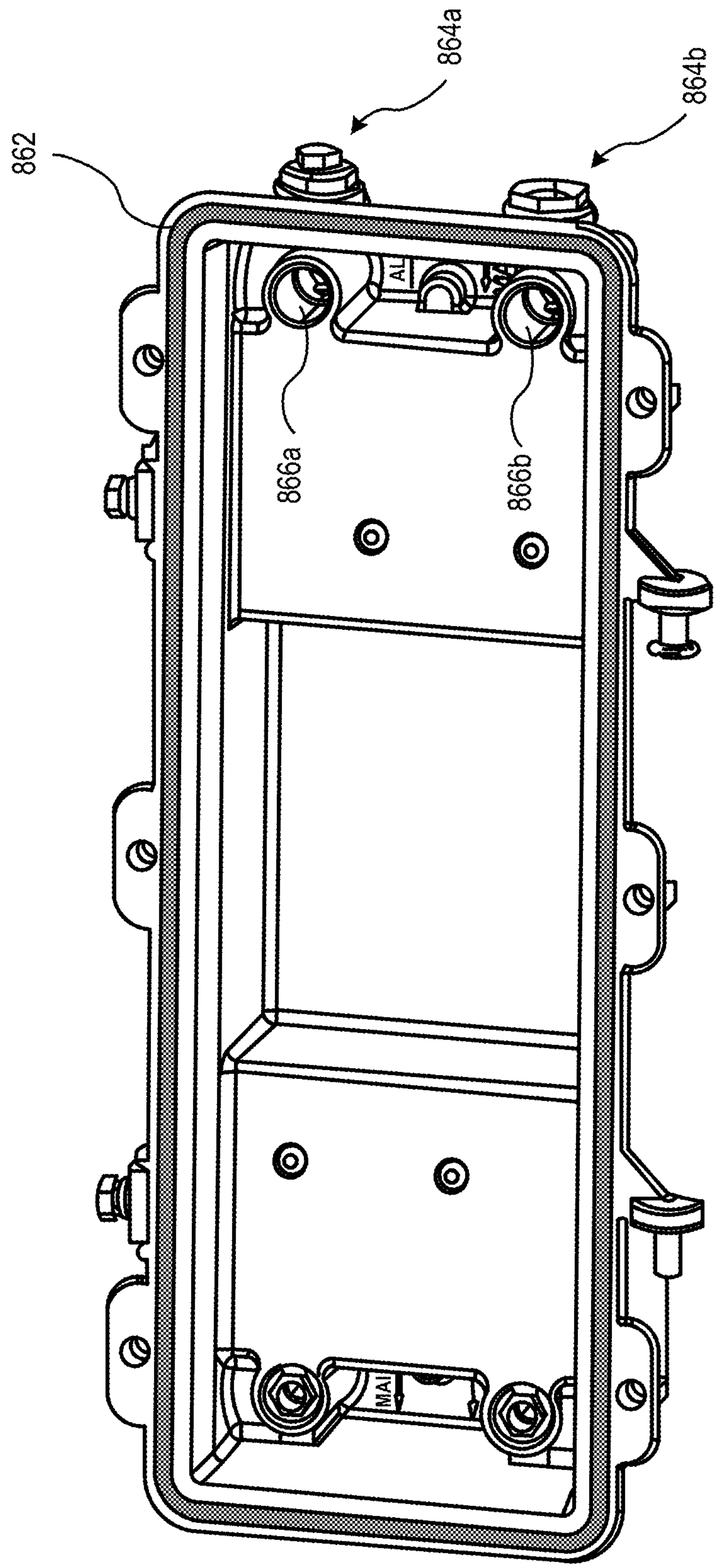
FIG. 8B is a housing portion of the HFC network amplifier shown in FIG. 8A including recessed regions for receiving coaxial cable seizure assemblies, consistent with an embodiment of the present disclosure.

Referring to FIGS. 8A and 8B and 9A and 9B, a coaxial cable seizure assembly may be used in an HFC amplifier 860 to provide a coaxial cable connection to cables outside of the HFC amplifier 860. The HFC amplifier 860 may include an amplifier housing 862 having coaxial cable connector ports 864*a*, 864*b* for connecting to coaxial cables. As shown in FIG. 8B, the amplifier housing 862 may include recessed regions 866*a*, 866*b* located inside of the housing 862 adjacent the respective coaxial cable connector ports 864*a*, 864*b* for receiving coaxial cable seizure assemblies, such as the coaxial cable seizure assembly 200 shown in FIGS. 4A-4E.

Figure 9A:
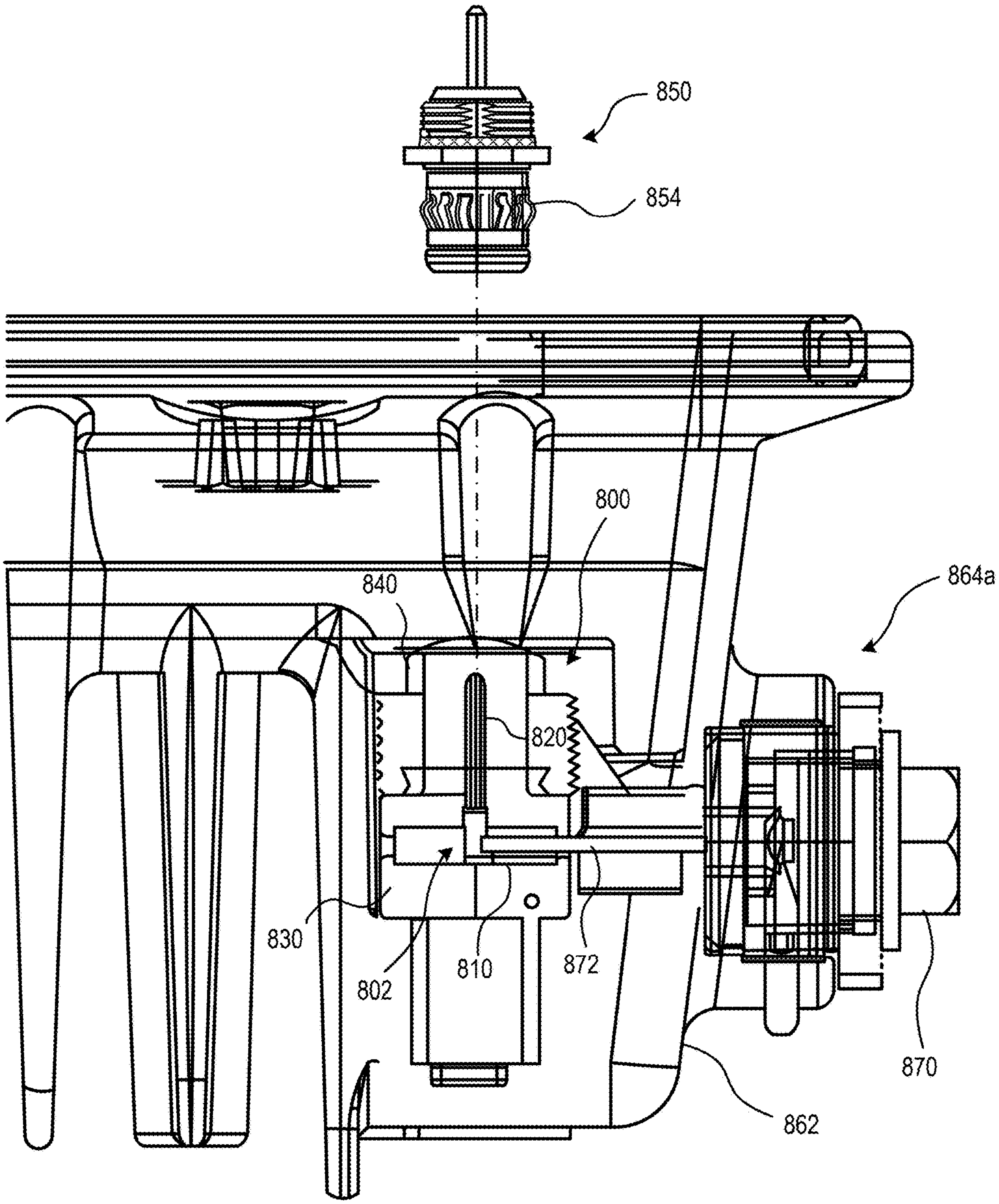
FIG. 9A is a cross-sectional view of the housing portion shown in FIG. 8B with a coaxial seizure assembly located in the housing portion adjacent to a coaxial cable port and connected to a coaxial cable center pin.
Figure 9B:
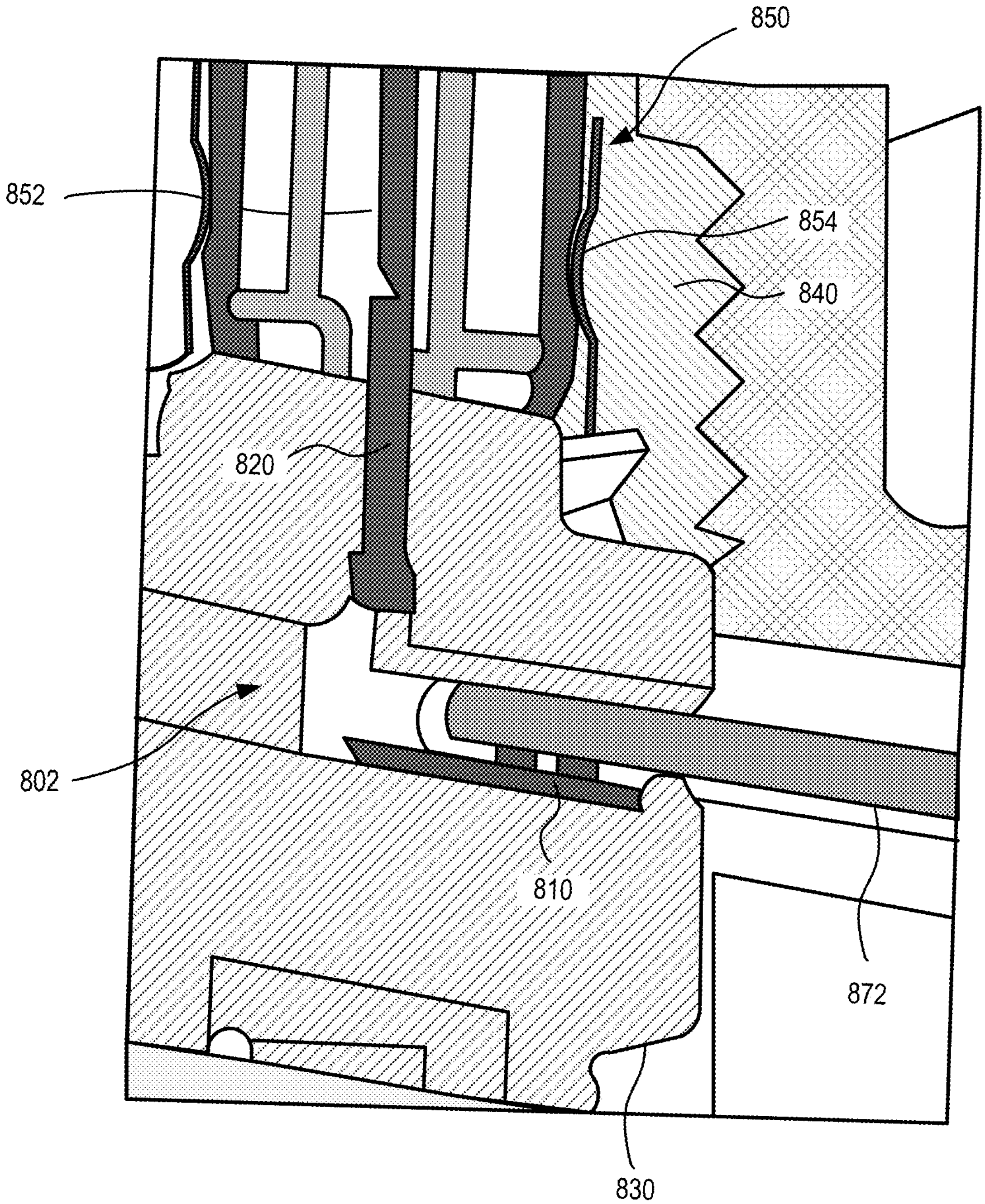
FIG. 9B is an enlarged view of a coaxial cable seizure assembly in a housing portion connected to a coaxial cable center pin and a G-type connector in the housing portion.

FIGS. 9A and 9B show a coaxial cable seizure assembly 800 located in a recessed region adjacent a coaxial cable connector port 864*a* and connected to a coaxial cable center conductor pin 872 of a coaxial cable connected to the port 864*a*. A lock nut 840 secures an insulator portion 830 of the seizure assembly 800 in the recessed region such that a leaf spring receptacle portion 810 of the stamped conductor 802 is aligned with the port 864*a* and a pin portion 820 of the stamped conductor 802 is located in an aperture defined by the lock nut 840. As shown in both FIGS. 9A and 9B, the coaxial cable center conductor pin 872 passes into and engages the leaf spring receptacle portion 810.

A coaxial RF connector 850, such as a G-type connector, is received in the aperture defined by the lock nut 840 and engages the pin portion 820 to make an electrical connection. An inner conductive portion 852 (shown in FIG. 9B) of the coaxial RF connector 850 receives and is electrically connected to the pin portion 820 and an outer mating portion 854 is received in the receptacle defined by the lock nut 840.

Figure 10:
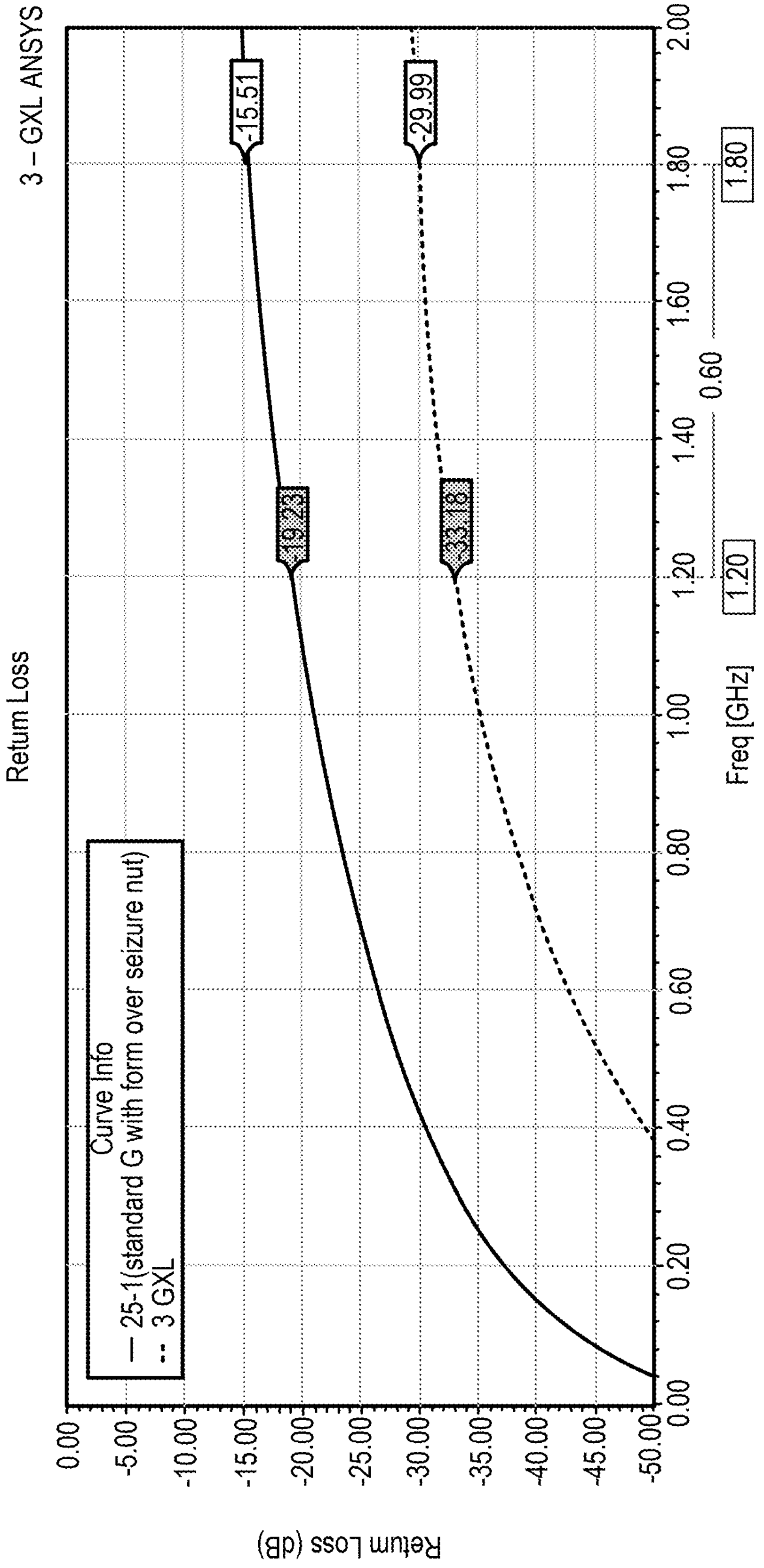
FIG. 10 illustrates simulation data obtained from RF simulations performed for a coaxial cable seizure assembly with a stamped conductor connected with a G-type connector.

FIG. 10 illustrates simulation data obtained from RF simulations using HFSS software from Ansys for the coaxial seizure assembly 100 used with a G-type connector. As shown, the coaxial seizure assembly 100 with the stamped conductor may provide improved impedance matching in a coaxial cable seizure assembly for better return loss, for example a return loss of −30 dB out to 2 GHz.

Accordingly, coaxial cable seizure assemblies with a stamped conductor portion, consistent with embodiments of the present disclosure, allow an easier fabrication, facilitate a connection with a coaxial cable center conductor pin of various lengths, and provide improved impedance matching for better return loss, particularly at higher frequencies (e.g., 2 GHZ).

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A seizure assembly for connecting to a coaxial cable in a hybrid fiber-coaxial (HFC) network device, comprising:

an insulator portion defining a spring receptacle passageway extending to a center conductor pin receiving opening in a side of the insulator portion; and a stamped conductor fixed in the insulator portion, the stamped conductor including a leaf spring receptacle portion located in the spring receptacle passageway adjacent the center conductor pin receiving opening, wherein the leaf spring receptacle portion is configured to receive a coaxial cable center conductor pin that passes through the center conductor pin receiving opening, wherein the leaf spring receptacle portion is formed by opposing leaf spring members that are spaced to receive and apply a force to the coaxial cable center conductor pin, and wherein the stamped conductor is stamped from a single piece of metal.

2. The seizure assembly of claim 1, wherein the insulator portion is configured to mount to a printed circuit board (PCB), and wherein the stamped conductor includes a PCB mounting portion formed from the single piece of metal, wherein the PCB mounting portion is configured to be electrically connected to the PCB.

3. The seizure assembly of claim 1, wherein the opposing leaf spring members provide contact with the coaxial cable center conductor pin, and wherein the contact has a box shape.

4. The seizure assembly of claim 1, wherein the opposing leaf spring members define a center pin receiving passageway that is open at a back end.

5. The seizure assembly of claim 1 wherein the insulator portion includes a first end, a second end and a side and defines a pin passageway extending from the spring receptacle passageway to the first end, and wherein the stamped conductor includes a pin portion formed from the single piece of metal, the pin portion is located in the pin passageway and extends beyond the first end of the insulator portion, and wherein the pin portion is configured to engage with a coaxial RF connector in the HFC network device.

6. The seizure assembly of claim 5 further comprising a lock nut provided at the first end of the insulator portion, wherein the pin portion extends into an aperture defined by the lock nut, and wherein the lock nut is configured to receive the coaxial RF connector.

7. The seizure assembly of claim 5, wherein the pin portion is formed as a cylindrical pin portion with a rounded end.

8. A PCB-mounted coaxial cable seizure assembly for connecting to a coaxial cable in a hybrid fiber coaxial (HFC) network device, comprising:

a printed circuit board (PCB);

an insulator portion mounted to the PCB, the insulator portion defining a spring receptacle passageway extending to a center conductor pin receiving opening in a side of the insulator portion; and a stamped conductor fixed in the insulator portion, the stamped conductor including a leaf spring receptacle portion and a PCB mounting portion stamped from a single piece of metal, wherein the leaf spring receptacle portion is located in the spring receptacle passageway adjacent the center conductor pin receiving opening, wherein the leaf spring receptacle portion is configured to receive a coaxial cable center conductor pin that passes through the cable center pin receiving passageway, wherein the leaf spring receptacle portion is formed by opposing leaf spring members that are spaced to receive and apply a force to the coaxial cable center conductor pin, and wherein the PCB mounting portion extends from the leaf spring portion and is electrically connected to the PCB.

9. The PCB-mounted cable seizure assembly of claim 8, wherein the opposing leaf spring members provide contact with the coaxial cable center conductor pin, and wherein the contact has a box shape.

10. The PCB-mounted cable seizure assembly of claim 8, wherein the opposing leaf spring members define a center pin receiving passageway that is open at a back end.

11. The PCB-mounted cable seizure assembly of claim 8, further including a pin extending from the PCB and configured to mate with a coaxial RF connector in the HFC network device, wherein the pin and the PCB mounting portion of the stamped conductor are electrically connected via the PCB.

12. The PCB-mounted cable seizure assembly of claim 11, wherein the pin is mounted on one side of the PCB, and wherein the insulator portion and the stamped conductor are mounted on an opposite side of the PCB.

13. The PCB-mounted cable seizure assembly of claim 11, wherein the pin, the insulator portion and the stamped conductor are mounted on a same side of the PCB.

14. A hybrid-fiber coaxial (HFC) network device, comprising:

a housing including at least one coaxial cable port configured to connect to a coaxial cable external to the housing; and at least one seizure assembly secured in the housing adjacent to the coaxial cable port such that a coaxial cable center conductor pin of the coaxial cable extends through the coaxial cable port and into the seizure assembly, wherein the seizure assembly comprises:

an insulator portion defining a spring receptacle passageway extending to a center conductor pin receiving opening in a side of the insulator portion, wherein the spring receptacle passageway aligns with the at least one coaxial cable port in the housing; and a stamped conductor fixed in the insulator portion, the stamped conductor including a leaf spring receptacle portion located in the spring receptacle passageway adjacent the center conductor pin receiving opening, wherein the leaf spring receptacle portion is configured to receive and engage with the coaxial cable center conductor pin extending into the at least one coaxial cable port and passing through the center conductor pin receiving opening, wherein the leaf spring receptacle portion is formed by opposing leaf spring members that are spaced to receive and apply a force to the coaxial cable center conductor pin, and wherein the stamped conductor is stamped from a single piece of metal.

15. The HFC network device of claim 14 wherein the insulator portion includes a first end, a second end and a side and defines a pin passageway extending from the spring receptacle passageway to the first end, and wherein the stamped conductor includes a pin portion formed from the single piece of metal, the pin portion is located in the pin passageway and extends beyond the first end of the insulator portion, and wherein the pin portion is configured to engage with a coaxial RF connector in the HFC network device.

16. The HFC network device of claim 14 further including a printed circuit board (PCB) located in the housing adjacent to the coaxial cable port, wherein the insulator portion is mounted to the PCB, and wherein the stamped conductor includes a PCB mounting portion formed from the single piece of metal, wherein the PCB mounting portion is electrically connected to the PCB.

17. The HFC network device of claim 14, wherein the opposing leaf spring members provide contact with the coaxial cable center conductor pin, and wherein the contact has a box shape.

18. The HFC network device of claim 14, wherein the opposing leaf spring members define a center pin receiving passageway that is open at a back end.

19. The HFC network device of claim 14 wherein the housing includes a recessed region inside of the housing and adjacent to the coaxial cable port, and wherein the seizure assembly is located in the recessed region such that the leaf spring receptacle aligns with the coaxial cable port.

20. The HFC network device of claim 19 further comprising a lock nut securing the insulator portion of the seizure assembly in the recessed region of the housing, wherein the pin portion extends into an aperture defined by the lock nut, and wherein the lock nut is configured to receive the coaxial RF connector.

* * * * *